Patented Oct. 8, 1946

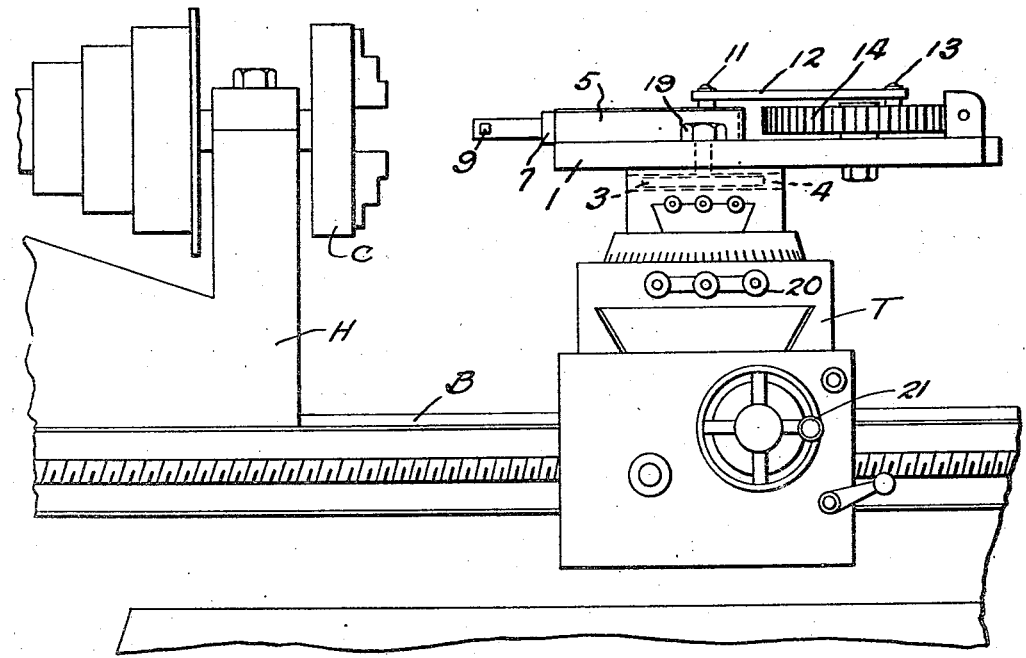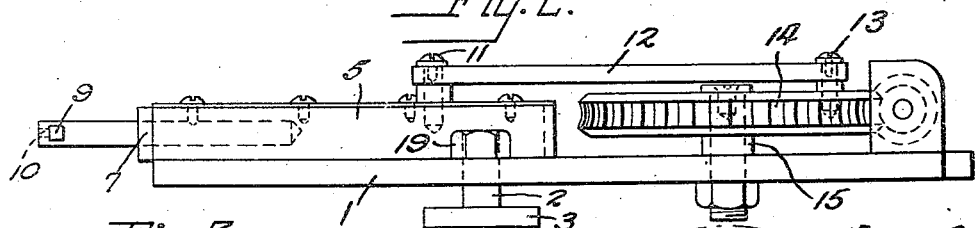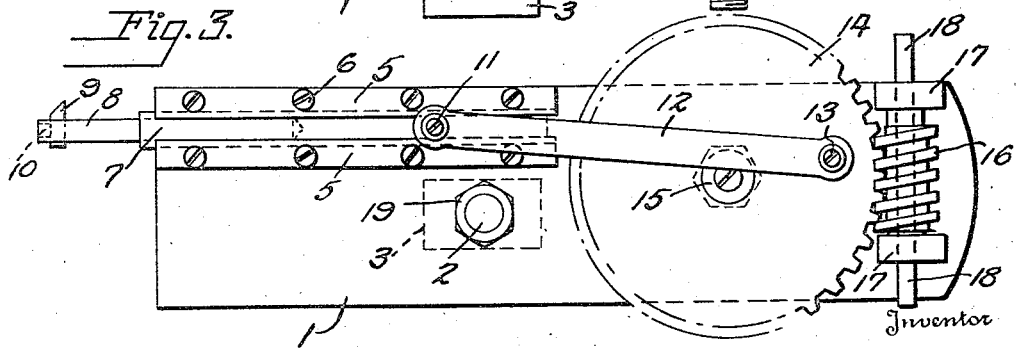

2,408,876

UNITED STATES PATENT OFFICE 2,408,876

ATTACHMENT FOR LATHES

Jack Pigott and Norris B. Opheim, Newport News, Va.

Application January 29, 1945, Serial No. 575,022

2 Claims. (Cl. 90—39)

This invention relates to lathes, and more particularly to an attachment for lathes by which work normally done on a shaper or milling machine can be efficiently performed on the lathe, eliminating the necessity for removing work after the turning operation and resetting the work in another machine.

In connection with the machining of ships' propellers, it is customary to turn the bore in the hub on a lathe and heretofore it has been necessary, after the turning operation, to remove the propeller from the lathe and set it up in a shaper or milling machine to cut the keyway slot by means of which the propeller is secured to the propeller shaft. The present invention relates to a simple attachment for a lathe by which this slot can be effectively cut in the propeller hub while it is still in the headstock chuck of the lathe, thus eliminating removal and resetting of the propeller in another machine.

The attachment of the present invention has a more general application in connection with cutting teeth on gears or interiorly on gear rings after the turning operation in the lathe and without the removal of such members from the lathe, and other applications will readily suggest themselves to those skilled in the art.

The object of the invention is to provide improved means for converting a lathe into a shaper and thereby eliminating the removal of the work from the lathe after the turning operation has been completed.

Further objects will more particularly appear in the course of the following detailed description.

The invention consists in the novel construction, arrangement and combinations of parts hereinafter more particularly described and claimed.

One sheet of drawings accompanies this specification as part thereof, in which like reference characters indicate like parts throughout.

In the drawing:

Figure 1 is a fragmentary front elevation of a portion of a lathe showing the headstock tool carriage and the attachment of the present invention;

Figure 2 is a side elevation of the attachment of the present invention removed from a lathe; and Figure 3 is a plan view of the attachment.

Referring to the drawing and particularly Figure 1, B represents the bed of a conventional lathe, H the headstock and C a work-holding chuck, while T represents a conventional tool carriage upon which is normally mounted a tool holder by means of the slot 4 but not shown herein.

The present invention includes an attachment which comprises a base 1 which is of generally rectangular shape, upon which base is secured a depending stud 2 having on its lower end a head 3 shaped to slidingly enter the slot 4 of the tool carriage T and be clamped in firm position on said tool carriage as by nut 19.

Mounted upon base 1, adjacent one end, are the guide members 5—5 secured to the base 1 as by screws 6 in parallel spaced relationship to constitute a guideway for a reciprocating carriage 7 formed on its outer end 8 to receive a tool 9 which is secured in position as by screw 10.

Adjacent the opposite end of base 1 is secured an upwardly projecting spindle 15 upon which is rotatably mounted a worm gear 14. The slidable carriage 7 is connected to the gear 14 by a link 12 pivotally connected to the slide 7 as at 11 and eccentrically pivoted to the gear 14 as at 13.

Bearing brackets 17 are positioned in spaced relationship on base 1 adjacent gear 14 to carry a worm 16 arranged to engage worm gear 14. The ends of the worm shaft 18 project beyond the bearing brackets 17 on either side of base 1 and are adapted to engage either a power drill or any other suitable source of rotary power (not shown).

In operation, after the work has been suitably turned with the normal lathe operations and without removing the work from the chuck C, the turning tool holder will be removed from the tool carriage T and replaced by base 1, as illustrated in Figure 1. In this position the tool carriage T can be adjusted as usual longitudinally of the lathe bed to bring the shaper attachment into its desired relationship with the work and by means of a power drill attached to the worm shaft 18 on either side of the lathe as convenient reciprocating motion can be given to the tool 9 carried by the attachment. The tool 9 is preferably arranged to cut on its outstroke and the tool carriage will be adjusted with respect to the lathe bed so that the stroke of the tool will pass completely through the portion of the work to be slotted. The tool can be adjusted transversely of the lathe bed by means of the adjustment handle 20 similarly to the handling of the cutting tool.

It will be observed that with this attachment not only can slots and teeth be formed with respect to an interior bore formed in the work but exterior teeth can also be cut in connection with gears or other similar work.

Various modifications in the precise construction and arrangement of the parts will readily suggest themselves to those skilled in the art but within the scope of the present invention as claimed.

Having thus described our invention, we claim:

1. Shaper attachment for lathes comprising a base, means for removably securing the base on the tool carriage of the lathe, parallel guides on the base, a slide operable between said guides, said slide formed at one end with means for holding a tool, a worm gear mounted on the base, a link eccentrically connecting the gear with the slide, a worm shaft extending transversely of the base, the ends of said worm shaft adapted to connect to a source of rotary power, and the worm engaging the worm gear.

2. Shaper attachment for lathes comprising a base, means for removably securing the base on the tool carriage of the lathe, parallel guides on the top face of the base, a slide operable between said guides, said slide formed at one end for holding a tool, a worm gear mounted on the base to rotate in a plane parallel with and adjacent the top face of the base, a link eccentrically connecting the gear with the slide, a worm shaft mounted on the top face of the base with its worm part engaging the gear, the ends of said shaft exposed on opposite sides of the base and formed for selective engagement with a source of rotary power.

JACK PIGOTT.
NORRIS B. OPHEIM.